US009323240B2

(12) United States Patent
Furumoto et al.

(10) Patent No.: US 9,323,240 B2
(45) Date of Patent: Apr. 26, 2016

(54) REMOTE CONTROL SYSTEM AND METHOD (71) Applicant: Yamaha Corporation, Hamamatsu-shi, Shizuoka-Ken (JP)

(72) Inventors: Yuki Furumoto, Hamamatsu (JP); Satoshi Takemura, Hamamatsu (JP); Hiroshi Shimizu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 635 days.

(21) Appl. No.: 13/679,612

(22) Filed: Nov. 16, 2012

(65) Prior Publication Data

US 2013/0131841 A1 May 23, 2013

(30) Foreign Application Priority Data

Nov. 18, 2011 (JP) ................................. 2011-253289

(51) Int. Cl.
*G05B 19/02* (2006.01)
*G05B 1/00* (2006.01)
*G08C 17/00* (2006.01)

(52) U.S. Cl.
CPC ........ *G05B 19/02* (2013.01); *G05B 1/00* (2013.01); *G08C 17/00* (2013.01); *G08C 2201/42* (2013.01); *G08C 2201/50* (2013.01)

(58) Field of Classification Search
CPC ............... G05B 19/02; G05B 2219/14119; G08C 17/00; G08C 2201/50; G08C 2201/42
See application file for complete search history.

(56) References Cited

U.S. PATENT DOCUMENTS

| 5,257,097 | A | * | 10/1993 | Pineau et al. | ................. 358/500 |
| 5,960,214 | A | * | 9/1999 | Sharpe et al. | .................... 710/15 |
| 6,731,992 | B1 | * | 5/2004 | Ziegler, Jr. | ....................... 700/65 |
| 2003/0003867 | A1 | * | 1/2003 | Kawamura | ....................... 455/41 |
| 2005/0212687 | A1 | * | 9/2005 | Nishikata | ................. 340/825.72 |
| 2009/0319276 | A1 | * | 12/2009 | Chang et al. | ................... 704/275 |
| 2011/0112701 | A1 | * | 5/2011 | Johnson et al. | ............... 700/295 |

FOREIGN PATENT DOCUMENTS

| EP | 1 528 522 | A2 | 5/2005 |
| EP | 2 563 039 | A1 | 2/2013 |
| JP | 2009-218937 | A | 9/2009 |
| JP | 2009-218947 | A | 9/2009 |
| WO | WO 2011/132774 | A1 | 10/2011 |

OTHER PUBLICATIONS

Extended European Search Report dated May 6, 2013 (seven (7) pages).

* cited by examiner

*Primary Examiner* — Ramesh Patel
(74) *Attorney, Agent, or Firm* — Crowell & Moring LLP (57) ABSTRACT When a controlled device receives a change command from a control device, the controlled device changes a real current memory, generates a change notification that includes first data indicative of the control device having transmitted the change command and second data indicative of the change result in response to the change command, and transmits the generated change notification to the plurality of control devices. Each control device receives a change notification from the controlled devices, changes a virtual current memory based on the second data of the change notification if the first data of the change notification does not indicate the control device. Each control device does not change the virtual current based on the second data included in the change notification if the first data indicates the control device.

5 Claims, 4 Drawing Sheets

REMOTE CONTROL SYSTEM AND METHOD

The present invention relates to a remote control technique for performing remote control and/or remote monitoring on an operation of a controlled device in a system comprising a plurality of control devices and the controlled device connected to each other via a communication network.

Conventionally, it is known a remote control system in which a plurality of control devices and a plurality of audio devices are connected to each other via a communication network such as the Ethernet (registered trademark) and the plurality of control devices can perform control (remote control) on an operation of each audio device or monitoring (remote monitoring) operation condition of the audio device operation. Such a remote control system is disclosed in, for example, Japanese patent application laid-open publication Nos. 2009-218937 and 2009-218947.

The plurality of audio devices (namely, controlled devices) to be remotely controlled or remotely monitored may be, for example, any of digital audio mixers (hereinafter, simply referred to as "mixers"), power amplifiers, recorders, audio signal input/output devices, or the like. Each of such audio devices includes a current memory (namely, a real current memory) storing a plurality of parameters for controlling an operation of the audio device, and thus controls the operation of the audio device itself based on values of the parameters of the real current memory. For example, substance or instance of the operation of the audio device include path control (routing) of an audio signal and various kinds of audio signal processing.

On the other hand, each of the control devices includes a plurality of current memories (namely, virtual current memories) each corresponding to the real current memory of each audio device, and each control device is configured to display a value of a parameter stored in each virtual current memory via a user interface of the control device itself. In order to perform the remote control and/or the remote monitoring of the audio devices, the control device synchronizes each of the virtual current memories with the real current memory corresponding to the virtual current memory (namely, a copy of the value of the parameter from one of the real and virtual current memories to another is made so that the corresponding real and virtual current memories store the same value of the parameter). As a result, the control device can display the value of the parameter of the real current memory of the controlled device via the user interface of the control device itself. Namely, a user can remotely monitor an operation condition or state (i.e., the value of the parameter of the real current memory) of the controlled device (i.e., audio device) at the control device.

In the aforementioned remote control system, the following is an exemplary way such that a given control device performs remote control on an operation of a given audio device and another control device performs remote monitoring on the given audio device. When a user performs an operation of changing a value of a parameter of the given audio device through the given control device, the given control device updates the value of the parameter in a virtual current memory of the given control device itself in response to the user's operation of changing the value of the parameter and transmits a "change command" corresponding to this operation to the given audio device. Next, the given audio device having received the change command updates a value of a parameter in a real current memory of the given audio device itself in response to the received change command and transmits a "change notification" indicating the update result to all of the control devices in the remote control system. Then, all of the control devices change individual values of individual parameters stored in individual virtual current memories of the control devices themselves corresponding to the real current memory of the given audio device to a value indicated by the received change notification. Thus, the value of the parameter stored in the virtual current memory of each control device becomes the same as the value of the parameter of the real current memory of the audio device corresponding to the virtual current memory.

Specifically, the aforementioned user's operation of changing the value of the parameter in the control device is performed by operating any of controls installed in an operation panel of the control device. For example, the controls may include any of a knob configured to be rotatably operated, a fader configured to be slidably operated in a linear direction, and a button switch configured to be operated in a depressing manner. When a control operated by the user is a continuously changeable type control such as a knob or a fader, the value of the parameter is continuously changed with a continuous change in an operation state of the control. In this case, while the continuous change of the control continues, the control device continuously outputs a plurality of change commands to the audio device to be remotely controlled.

In general, in the remote control performed via the communication network in the aforementioned remote control system, there is non-constant time delay between transmission of the change command from the control device to the audio device and transmission of the change notification corresponding to the change command from the audio device to the control devices. Due to the time delay relevant to the remote control, a problem may arise in that a given control device transmits a latest change command in response to a user's operation, and then the control device may receive, from the audio device, an old change notification corresponding to an old change command (first change command) having transmitted before the latest change command (second change command). In particular, this problem may easily occur, when a plurality of change commands are continuously output (for example, when a continuously changeable type control such as a knob or a fader is operated), as described above. In this case, in the control device, the value of the parameter of the virtual current memory of the control device may be changed by the change notification received from the audio device, irrespective of the current operation state of the control. As a result, a situation may occur in which the value of the parameter displayed in the control device does not directly follow the current operation state of the control.

In view of the foregoing, it is an object of the present invention to provide a remote control technique capable of suppressing an influence of delay relevant to the remote control of a value of a parameter stored in a control device having received a user's operation of changing the value of the parameter.

In order to accomplish the above-mentioned objects, the present invention provides an improved system, which comprises a plurality of control devices and at least one controlled device connected to each other via a communication network, the controlled device comprising a first memory adapted to store a parameter for controlling an operation of the controlled device, the controlled device configured to change a value of the parameter stored in the first memory based on a change command transmitted from any one of the control devices, each of the plurality of control devices comprising a second memory adapted to store a parameter corresponding to the parameter stored in the first memory of the controlled device, each of the plurality of control devices configured to change a value of the parameter stored in the second memory in response to a user's operation and transmit the change command corresponding to the change to the controlled device. The controlled device further comprises a change notification transmitting unit adapted to, in response to reception of the change command from any one of the control devices, transmit a change notification to the plurality of control devices, the change notification including first data indicative of the one of the control devices as a transmission source of the change command and second data indicative of a value of the parameter stored in the first memory which is changed based on the change command. Each of the plurality of control devices further comprises a change notification receiving unit adapted to, in response to reception of the change notification from the controlled device, update the value of the parameter stored in the second memory based on the second data of the received change notification when the first data included in the received change notification does not indicate the control device, whereas the change notification receiving unit does not update the value of the parameter stored in the second memory when the first data indicates the control device.

In an embodiment, the controlled device may further comprise a change operation receiving unit adapted to change the value of the parameter stored in the first memory in response to the user's operation, and the change notification transmitting unit adapted to, in response to the change in the value of the parameter by the change operation receiving unit, generate the change notification including the first data indicative of no control device and the second data indicative of the changed value of the parameter and transmit the generated change notification to the plurality of control devices via the communication network.

In an embodiment, the change notification transmitting unit may be configured to repeatedly transmit the change notification at time intervals.

According to the present invention, because the change notification transmitted from the controlled device to each control device via the network is configured to include the first data indicative of the control device having transmitted the change command corresponding to the change notification and the control device (i.e., the control device having received the user's operation of changing the value of the parameter) having transmitted the change command does not update (namely, change) the value of the parameter in the second memory in response to the change notification corresponding to the change command, the value of the parameter of the second memory of the control device can be maintained as the value responsive to the user's operation of changing the value of the parameter. There is no delay relevant to the remote control which might be caused due to the fact that the displayed value of the parameter does not directly follow the current operation state because the value of the parameter in the second memory is not updated (changed) in response to the change notification transmitted via the network. On the other hand, the value of the parameter of the controlled device can be remotely monitored quickly in the control devices other than the control device having transmitted the change command on the network because the respective values of the parameters in the second memories of the other control devices are updated (changed) based on the second data included in the change notification corresponding to the change command. Namely, in the system according to the present invention in which the plurality of control devices perform remote control and remote monitoring on the value of the parameter of the controlled device, it is possible to obtain the excellent advantage of suppressing the influence of the delay relevant to the remote control on the value of the parameter stored in the control device having received the user's operation of changing the value of the parameter.

Further, because the change command receiving unit of the controlled device generates and transmits the change notification at each predetermined notification period, and the first data included in the change notification is configured to indicate the control device having finally transmitted the change command of the parameter within the notification period and the second data is configured to indicate the value of the parameter at the final time of the notification period, even when the value of one parameter is changed a plurality of times within the notification period, only one change notification is generated and transmitted within the notification period, and the number of change notifications generated and transmitted in the notification period can be reduced.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

Certain preferred embodiments of the present invention will hereinafter be described in detail, by way of example only, with reference to the accompanying drawings, in which.

In the remote control system illustrated in FIG. 1, one mixing console 1 (Con: hereinafter, referred to as a "console"), two personal computers (PCs) 2 and 3, one digital audio mixer 4 (mixer: hereinafter, referred to as a "mixer"), two power amplifiers (amp: hereinafter, referred to as "amplifiers") 5 and 6, one effector (eff.) 7, and one stage box (sbox) 8 are connected to each other via a communication network 9.

The mixer 4, the amplifiers 5 and 6, the effector 7, and the stage box 8 are audio devices which perform signal processing relating to audio signal, such as audio signal routing or audio signal processing, and are controlled devices which are subjected to operation control (remote control) and monitoring (remote monitoring) of an operation condition or state by the control devices 1 to 3.

The console 1 and the PCs 2 and 3 each functions as a control device by executing a software program (remote control software) for the remote control and the remote monitoring on each of the controlled devices 4 to 8 in the remote control system. The console 1 is a physical controller dedicated to control of the signal processing (operations of the controlled devices 4 to 8) on an audio signal. The PCs 2 and 3 are general personal computers on which a general operating system (OS) is loaded and mounts the remote control software as one of application programs.

The communication network 9 is, for example, a local area network (LAN) formed by physically connecting the plurality of devices 1 to 8 via general network cables such as the Ethernet (registered trademark). Data communication can be enabled in conformity with the TCP/IP protocol between the devices 1 to 8 on the communication network 9. Further, an audio signal may be transmitted in real time between the devices via the network 9. In such a case, as a data transmission format, for example, a widely known appropriate data transmission format such as CobraNet (registered trademark) can be applied.

Figure 2:
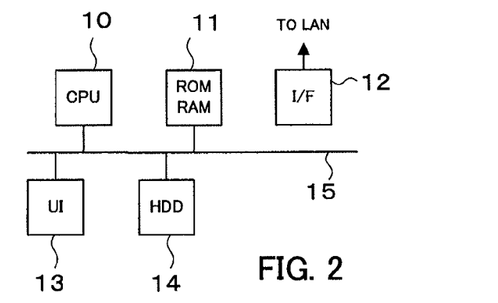
FIG. 2 is a block diagram illustrating an electric hardware configuration of a control device.

FIG. 2 is a block diagram illustrating the overview of an electric hardware configuration of any one of the console 1 and the PCs 2 and 3 used as the control devices. As illustrated in FIG. 2, each of the control devices includes a central processing unit (CPU) 10, a memory 11 including a read-only memory (ROM) and a random access memory (RAM), a network interface (I/F) 12, a user interface (UI) 13, and a hard disk (hard disk drive (HDD)) 14. The components 10 to 14 are connected to each other via a CPU bus 15.

The CPU 10 performs various control programs stored in the memory 11 to control all operations (or processes) of the control device (the console 1 or the PC 2 or 3). The memory 11 stores the various control programs and is used as a loading area or a work area of a program executed by the CPU 10. The memory 11 also includes a current memory (a virtual current memory, that is, a second memory) adapted to store a plurality of parameters for use of the remote control/remote monitoring on the operations (or processes) of the controlled devices 4 to 8 in the remote control system (see FIG. 5 to be described below). The HDD 14 is an example of an external storage device. The memory 11 or the HDD 14 stores the remote control software.

The console 1 includes, as the user interface 13, for example, various kinds of and a number of controls such as a knob configured to be rotatably operated, a fader configured to be slidably operated in a linear direction, a button switch configured to be operated in a depressing manner and a display adapted to display various information. Each of the PCs 2 and 3 may include, as the user interface 13, a display adapted to display various information and an input unit for receiving various user's operations (inputs) on a screen displayed on the display, for example, a mouse, a keyboard and the like are used as the input unit. The network interface 12 is an interface for communicably connecting the control device to the communication network 9.

Figure 3:
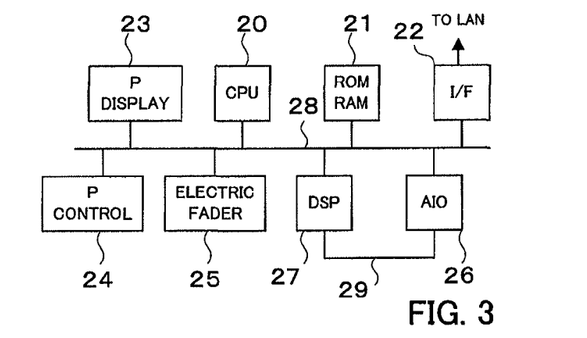
FIG. 3 is a block diagram illustrating an electric hardware configuration of a mixer which is one of controlled devices.

FIG. 3 is a block diagram illustrating an electric hardware configuration of the mixer 4. The mixer 4 includes a CPU 20, a memory 21 including a ROM and a RAM, a network interface 22, a panel display unit (P display) 23, a panel control (P control) 24, an electric fader (electric F) 25, an audio input/output unit (AIO) 26, and a signal processing unit (digital signal processor (DSP)) 27. These components 20 to 27 are connected to each other by a CPU bus 28. The audio input/output unit 26 and the DSP 27 are connected to each other by an audio bus 29.

The CPU 20 performs various control programs stored in the memory 21 to control all operations (or processes) of the mixer 4. The memory 21 stores the various control programs and is used as a loading area or a work area of a program executed by the CPU 20. The memory 21 also includes a current memory (real current memory, that is, a first memory) adapted to store a plurality of parameters for controlling the operations (or processes) of the mixer 4 (see FIG. 6 to be described below). The network interface 22 is an interface for communicably connecting the mixer 4 to the communication network 9.

The panel display unit 23, the panel control unit 24, and the electric fader unit 25 are user interfaces installed in an operation panel of the mixer 4. The panel display unit 23 is configured by, for example, a touch panel type liquid crystal display and can display various screens based on display control signals provided from the CPU 20 via the CPU bus 28. The panel control unit r 24 comprises one or more controls that include a knob, a pressing button switch and the like and are disposed on the operation panel. The electric fader unit 25 comprises one or more fader type controls each operable by both a user's operation and an automatic driving force based on a driving control signal provided from the CPU 10.

The audio input/output unit 26 is an interface for connecting to an external device such as a microphone or a recorder to input and/or output an audio signal. The audio input/output unit 26 includes a mechanism adapted to perform analog-to-digital conversion (AD conversion), digital-to-analog conversion (DA conversion), and digital conversion (format conversion).

The DSP 27 performs various kinds of signal processing regarding audio mixing on the audio signal input from the audio input/output unit 26 based on the values of the various parameters stored in the real current memory of the memory 21 by executing various micro-programs in response to instructions of the CPU 20, and outputs the processed audio signal from the audio input/output unit 26. The various kinds of signal processing include controlling the volume level of the audio signal, mixing the plurality of audio signals, and granting an effect to the audio signal.

Figure 4:
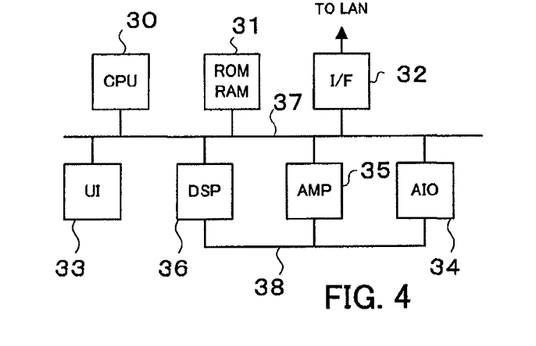
FIG. 4 is a block diagram illustrating an electric hardware configuration of a power amplifier which is one of the controlled devices.

FIG. 4 is a block diagram illustrating an electric hardware configuration of any one of the amplifiers 5 and 6. Each of the amplifiers 5 and 6 may include a CPU 30, a memory 31, a network interface 32, a user interface 33, an audio input/output unit 34, an amplification unit (AMP) 35, and a DSP 36. These components 30 to 36 are connected to each other by a CPU bus 37. The audio input/output unit 34, the AMP 35, and the DSP 36 are connected to each other by an audio bus 38.

The CPU 30 performs various control programs stored in the memory 31 to control all operations (or processes) of the amplifier. The memory 31 stores the various control programs and is used as a loading area or a work area of a program executed by the CPU 30. The memory 31 also includes a current memory (real current memory, that is, a first memory) adapted to store a plurality of parameters for controlling the operations (or processes) of the amplifier. The network interface 32 is an interface for communicably connecting the amplifier to the communication network 9. The user interface 33 includes various controls used to operate a volume level or the like and various indicators such as a level meter.

The audio input/output unit 34 is an interface for connecting to an external device such as a mixer or a speaker to input and/or output an audio signal. The DSP 36 performs signal processing on the audio signal input from the audio input/output unit 34 based on the values of various parameters stored in the memory 31 (real current memory) by executing various micro-programs in response to instructions of the CPU 30, and outputs the processed audio signal to the amplification unit 35. Examples of the signal processing include equalizer, delay, cross-over, and limiter. The AMP 35 amplifies the audio signal processed by the DSP 36 and outputs the amplified audio signal to an external device such as a speaker via the audio input/output unit 34.

The electric hardware configurations (not illustrated) of the effector 7 and the stage box 8 are substantially the same as the mixer shown in FIG. 3 or the amplifier shown in FIG. 4, in that the effector 7 and the stage box 8 each includes a CPU, a memory (real current memory, that is, a first memory), a network interface, a user interface, an audio input/output unit, and a DSP. The effector 7 is a device for imparting an effect to the input audio signal. The stage box 8 is a processor that has a function of inputting and outputting the audio signal.

Figure 5:
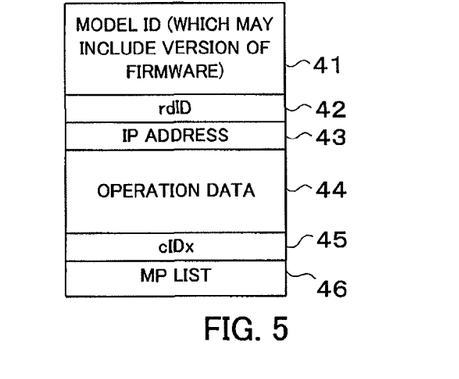
FIG. 5 is a diagram illustrating an example of a data structure of storage content in a memory of the controlled device.

FIG. 5 is a diagram illustrating a data structure of storage content of data regarding the remote control and the remote monitoring stored in the memories (denoted by reference numerals 21 and 31 in FIGS. 3 and 4, respectively) of the controlled devices (the mixer 4, the amplifiers 5 and 6, the effector 7, and the stage box 8). In the memory of each controlled device, as illustrated in FIG. 5, storage regions are prepared for a model ID 41, a real device ID (which is abbreviated to a "rdID") 42, an internet protocol (IP) address 43, process data 44, a controller IDx (which is abbreviated to a "cIDx") 45, a modified•parameter•list (which is abbreviated to an "MP list") 46. In the following description, the name of each storage region indicates data stored in the storage region.

The model ID 41 is ID (a fixed value) indicative of a model of a controlled device. When the model is the same but a version of a firmware is different between tow or more controlled devices, such controlled devices may have different functions from one another in some cases. Therefore, the model ID 41 may have a version number of the firmware and may be updated when the version is upgraded. The rdID 42 is identification information (ID) for identifying the individual controlled device at least within the network 9. For example, the rdID 42 may be an ID (which is a unique fixed value in maker's products) which a maker gives each product of the maker, may be a MAC address (which is a unique fixed value in the world) given to the interface 22 or 23 of the Ethernet (registered trademark), or may be a control ID (which is a unique user's variable value in the remote control system) given to a device used in the remote control system by the user. The IP address 43 is an address for designating the controlled device (or the interface 22 or 23) in communication via the network 9 and is unique at least on the network 9.

The operation data 44 are the current values of the plurality of parameters used to control the operation of the signal processing of the controlled device. A region in which the current values of the parameters are stored corresponds to the current memory (the real current memory, that is, the first memory). Hereinafter, what include parameters stored as the operation data 44 and the current memory region in which the parameters are stored is referred to as a "real current" 44. Each parameter in the real current 44 is specified by a parameter ID (which is abbreviated to "pID") unique in the real current 44. For example, the pID is a parameter number continuous in the real current 44. Hereinafter, the value of a parameter specified by a given pID in the real current 44 is abbreviated to "P(pID)." Here, the plurality of parameters of each controlled device have a data structure (for example, a kind of parameter, the pID of each parameter, or a range of the setting values of the parameters) unique in the model specified by the rdID.

cIDx 45 is temporary data for specifying the control device (which is a control device serving as a transmission source (origin) of a change command to be described below) having changed a given parameter value P(pID), when the given parameter value P(pID) in the real current 44 is changed. Whenever the given parameter value P(pID) is changed, identification information (rcID 61 to be described below) for specifying the control device having changed lastly the parameter value P(pID) or data (null) indicating no control device is temporarily set in the cIDx 45 through a process of FIG. 10 or 11 to be described below.

An MP list 46 is a list that stores one or more data pairs of a parameter pID of the parameters in the real current 44 whose value has been changed within a predetermined notification period as described below and a cIDx 45 indicative of a control device in which an operation of changing a value P(pID) of the parameter pID is performed. As an example of a method of implementing the MP list 46, a plurality of data pairs may be sorted in an ascending order or descending order of the pIDs. In this case, it is possible to easily and rapidly confirm whether the data pair of a given pID is present in the MP list 46.

Figure 6:
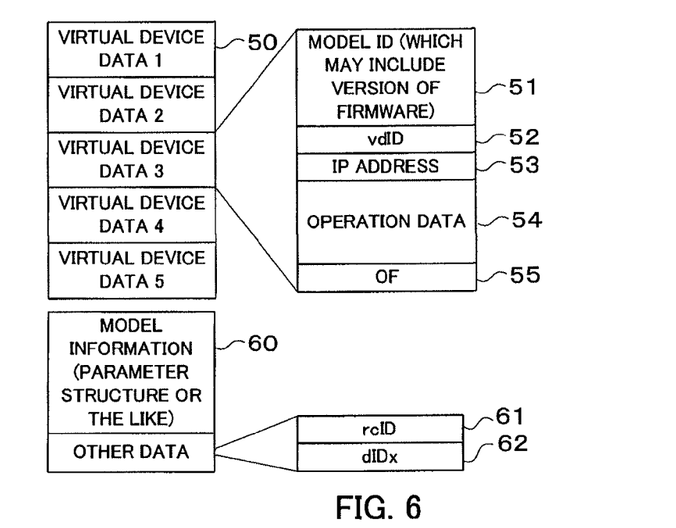
FIG. 6 is a diagram illustrating an example of a data structure of storage content in a memory of the control device.

FIG. 6 is a diagram illustrating a data structure of storage content of data regarding the remote control and remote monitoring stored in the memory 11 of the control devices (the console 1 and the PCs 2 and 3). The memory 11 of the control device stores five pieces of virtual device data 50 corresponding to the controlled devices 4 to 8 on the network 9. In FIG. 6, individual numbers are given to the virtual device data 50 to distinguish the virtual device data 50 from each other such as "virtual device data 1," "virtual device data 2," . . . "virtual device data 5." Each virtual device data 50 is data that virtually indicates the corresponding controlled device (audio device) on the control device. A virtual audio device indicated by the virtual device data 50 is referred to as a "virtual device." Further, the controlled devices 4 to 8 are referred to as "real devices" in the sense that the controlled devices are physical audio devices corresponding to the virtual devices.

In one virtual device data 50, a plurality of storage regions are prepared for a model ID 51, a virtual device ID (which is abbreviated to "vdID") 52, an IP address 53, operation data 54, an online flag (which is abbreviated to "OF") 55. The model ID 51 is an ID for specifying a model of the real device corresponding to the virtual device. vdID 52 is an ID for specifying the virtual device, and the same value as the rdID of the controlled device (real device) corresponding to the virtual device is set as a value of the vdID 52. When a given real device is in the online state with the control device, not only the real device but also the virtual device corresponding to the real device can be specified by the rdID of the real device. The IP address 53 is an IP address of the controlled device (real device) corresponding to the virtual device. vdID 52 and the IP address 53 are information for specifying the controlled device (real device) which should be associated with the virtual device and are determined by a remote control preparation process of FIG. 8 to be described below.

The operation data 54 is current values of the plurality of parameters corresponding to the real current 44 of the controlled device (real device) corresponding to the virtual device. A region in which the current values of the parameters are stored corresponds to the current memory (the virtual current memory, that is, the second current memory). Hereinafter, a set which includes parameters stored as the operation data 54 and the current memory region in which the parameters are stored is referred to as a "virtual current" 54. The virtual current 54 stores a plurality of parameters with substantially the same as the real current 44 of the corresponding controlled device by synchronizing with the corresponding real current 44 by the remote control preparation process as described below. Each parameter in the virtual current 54 is specified by a parameter ID (referred to as "pID") unique in the virtual current 54. The pID allocated to each parameter in the virtual current 54 is assumed to be the same parameter ID number as the corresponding parameter pID in the corresponding real current 44. Hereinafter, a value of a given pID in the virtual current 54 is referred to as an abbreviation of "P'(pID)".

The online flag (OF) 55 is a flag that indicates, by a binary value, whether the real device corresponding to the virtual device is in a state in which the remote control from the control device is enabled (i.e., online state). The OF 55 has the value of "1" in the case of the online and has the value of "0" in the case of offline. When the value of the OF 55 is "1," the real device corresponding to the virtual device can be remotely controlled by the control device.

In the memory 11 of the control device, storage regions are prepared for model information 60 which is a database for indicating a parameter structure or the like of each of various models and other data. Information regarding a parameter structure of a model specified by any model ID can be obtained by referring to the model information 60 with the model ID. A storage region of operation data of each virtual device data in FIG. 6 is prepared based on the data structure obtained by referring to the model information 60 with the model ID of the virtual device. In the other data, a real controller ID (which is abbreviated to "rcID") 61 is identification information identifying the individual control device at least within the network 9. For example, the rcID 61 may be a MAC address (which is a unique fixed value in the world) given to the interface 12 of the Ethernet (registered trademark) or may be a control ID (which is a unique user's variable value in the remote control system) given to each control device by the user. A device ID (which is abbreviated to "dIDx") 62 is temporary data for specifying the controlled device remotely controlled from the control device. To remotely control a given controlled device, vdID 52 of the virtual device corresponding to the controlled device is temporarily set in dIDx 62.

Figure 7:
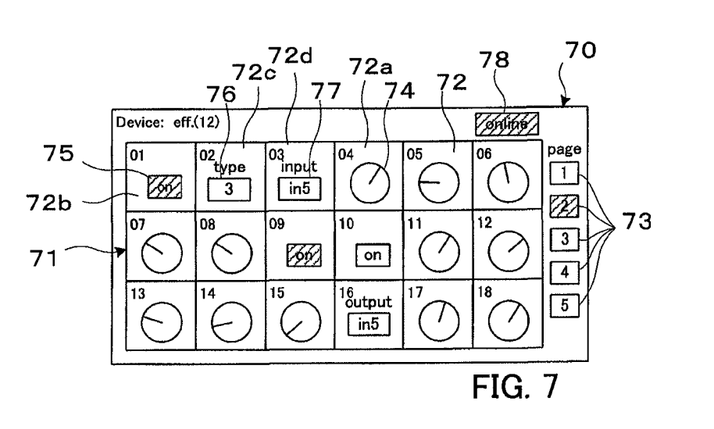
FIG. 7 is a diagram illustrating a parameter adjustment screen displayed in a user interface of the control device.

FIG. 7 is a diagram illustrating an example of a parameter adjustment screen 70 displayed on a display (UI 13 in FIG. 2) of the control device. The parameter adjustment screen 70 is a screen that displays the value of each parameter stored in the virtual current 54 for one virtual device and functions as a graphical user interface (GUI) that receives a user's operation of changing the value of the displayed parameter.

In the control device, a dedicated parameter adjustment screen is prepared for each of models of the audio devices. When the user designates a desired virtual device and gives an instruction to display a parameter adjustment screen corresponding to the desired virtual device, the CPU 10 of the control device displays the parameter adjustment screen 70 corresponding to the model of the designated virtual device on the display, and also displays the value of each parameter stored in the virtual current 54 of the designated virtual device in the parameter adjustment screen 70.

A character string "Device: eff. (12)" in the left upper corner of the parameter adjustment screen 70 is the device name of the virtual device being displayed on the parameter adjustment screen 70. The device name is displayed based on the vdID 52 of the virtual device to be controlled. For example, the device name includes a model name (e.g., "eff.") and individual identification information (e.g., "(12)"). The CPU 10 of the control device sets the vdID 52 of a given virtual device in the dIDx 62 of the memory 11, when the parameter adjustment screen 70 regarding the given virtual device is displayed.

A parameter value display section 71 is an area in which a user's operation of displaying and changing the value of each parameter is received. One frame 72 indicates one parameter. The value of the parameter is displayed or presented using a knob image or a button image displayed in the frame 72. A numeral of each frame is displayed in the left upper corner of each frame 72. In the example of the drawing, the parameter value display section 71 is configured to display eighteen parameters using eighteen frames 72 on one screen. Therefore, a parameter group displayed within one screen can be switched page by page using page switching buttons 73 on the right end of the screen. The page switching button 73 (the second button "2" from the upper side in the drawing) corresponding to the page being displayed in the current parameter value display section 71 is in a lighting state. In FIG. 7, hatching represents the lighting state of a GUI component such as a button image.

The parameter group displayed in the parameter value display section 71 includes a parameter, such as a volume, a depth, or a rate, that has a range of a plurality of values greater than two values, a parameter that indicates one of ON and OFF states using a binary value, and a parameter that indicates a selection state of a plurality of n options (for example, any type selection or a connection destination selection). For example, in a frame 72a, the value of a parameter having a continuously variable range of a plurality of values greater than two values is indicated by a rotation position (angle) of a knob image 74. In a frame 72b, the value (one of ON and OFF) of an ON/OFF parameter is indicated by lighting or non-lighting of a button image 75. In a frame 72c, a selection state of a type selection parameter is indicated by a character string "3" (representing a third type) on a button image 76. In a frame 72d, a selection state of an input source connection destination selection parameter is indicated by a character string "in5" (representing a fifth input ch) on a button image 77.

An online lamp 78 formed in the right upper side of the parameter adjustment screen 70 indicates whether the virtual device to be controlled is in the online state. When the virtual device is in the online state (when the value of the OF 55 of the virtual device is "1"), the online lamp 78 lights. When the virtual device is in the offline state (when the value of the OF 55 of the virtual device is "0"), the online lamp 78 does not light.

Figure 8:
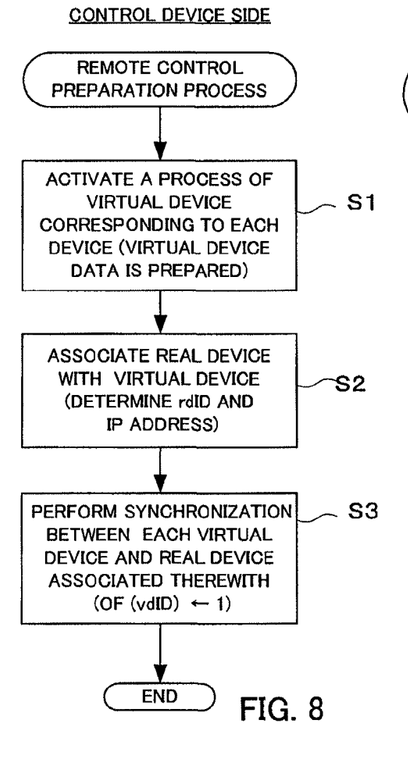
FIG. 8 is a flowchart illustrating a remote control preparation process performed by the control device.

When the virtual device to be controlled is in the online state (when the value of the OF 55 is "1"), the user of the control device can perform the remote control regarding the value of the parameter of the real current 44 of the controlled device (real device) corresponding to the virtual device to be controlled from the parameter adjustment screen 70. FIG. 8 is a flowchart illustrating a remote control preparation process performed by the CPU 10 of the control device (the console 1 and the PCs 2 and 3), when the remote control starts.

In step S1, the CPU 10 of the control device activates a process of each virtual device corresponding to each controlled device (real device) for which the remote control should be started and prepares the virtual device data 50 for each virtual device in the memory 11. That is, the storage region of the virtual device data 50 for each virtual device is reserved in the memory 11 and various kinds of data items (denoted by the reference numerals 51 to 55 in FIG. 6) are written on the regions of the virtual device data 50. The process of step S1 may be performed at any time. For example, when the user performs an operation of selecting a model, the virtual device of the selected model may be activated. Alternatively, the virtual device data 50 which has been previously used in the remote control may be stored as a project file, and at the time that the control device reads the project file, a plurality of virtual devices may be activated based on the virtual device data 50 included in the project file. Further, when the control device has newly found out a controlled device connected to the network, a virtual device corresponding to a model of the newly-found controlled device may automatically be activated on the condition that the virtual device of the same model corresponding to the newly-found controlled device is not activated yet.

In step S2, the CPU 10 of the control device performs to associate each virtual device having the process activated in step S1 with any one of the control devices (real devices) detected on the network 9. For example, the CPU 10 of the control device can collect the model ID 41, the rdID 42, and the IP address 43 from each controlled device (real device) on the network 9 and perform to associate each individual virtual device with each individual real device based on the collected information. When the controlled device has rdID 42 of a fixed value, the controlled device may be associated with the virtual device having the vdID 52 of a value same as the rdID 42. Alternatively, if the CPU 10 of the control device performs to associate any controlled device with any virtual device using the rdID 42 (or the IP address 43) which is a changeable value, the real device may be associated with the virtual device on the condition that not only the rdID 42 (or the IP address 43) accords with the vdID 52 (or the IP address 53) but the model IDs also accord with each other. In either case, the model IDs of the real device and the virtual device have to accord with each other minimally. Further, a correspondence relation between the real device and the virtual device for each model ID may be changed freely by the user. At the end of step S2, in response to user's instruction to confirm the correspondence relation, individual values of the vdID 52 and the IP address 53 for each virtual device corresponding to the virtual device data 50 prepared in step S1 are determined to be same as the rdID 42 and the IP address 43 of the real device corresponding to (or associated with) the virtual device. The process of step S2 may be performed at any time on the condition that there is the virtual device which has not corresponded to the real device.

In step S3, the CPU 10 of the control device synchronizes each virtual device and the real device associated therewith each other and sets a value of the online flag 55 (OF (vdID)) of the virtual device to "1". To synchronize the virtual device and the real device with each other means that values of individual parameters stored in the virtual current 54 of the virtual device and values of individual parameters stored in the real current 44 of the corresponding real device are set to be the same. The direction of the synchronization (whether the value of each parameter in the virtual current 54 is caused to accord with the value of each parameter in the real current 44 or the value of each parameter in the real current 44 is caused to accord with the value of each parameter in the virtual current 54) may be fixed to one direction or may be set in response to an instruction of the user. By synchronizing between the virtual device and the real device, the value of each parameter in the virtual current 54 becomes the same as the value of each parameter in the corresponding real current 44. Accordingly, the parameter adjustment screen 70 that display the value of each parameter in the virtual current 54 actually displays the value of the corresponding real current 44. When the user gives an instruction to cause one or more virtual devices to "enter an online state," the process of step S3 is performed on the virtual device. Alternatively, when a user's operation to confirm the correspondence relation between one or more real devices and one or more virtual devices has been made, the process of step S3 may be performed on the virtual device, which has corresponded to the real device, after the process of step S2.

Figure 9:
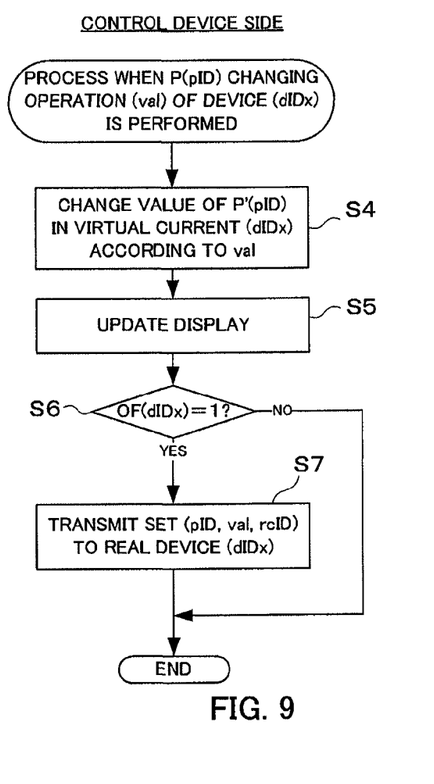
FIG. 9 is a flowchart illustrating a parameter value changing process performed by the control device in response to a user's operation.

The user of the control device can select one of the frames 72 of the parameter value display section 71 on the parameter adjustment screen 70 and can change and operate the value of the selected parameter using various physical controls (the UI 13 of the console 1) on the operation panel, a mouse, or a keyboard (the UI 13 of the PC 2 or 3). FIG. 9 is a flowchart illustrating a process performed by the CPU 10 of the control device in response to an operation of changing the values of the parameters on the parameter adjustment screen 70. When the user performs the operation of changing the value of a parameter, the CPU 10 of the control device detects a parameter change amount val in response to the operation, specifies the vdID of the virtual device (the virtual device that is displaying the parameter on the parameter adjustment screen 70) to be controlled and the pID of the operated and changed parameter, and activates the processes of FIG. 9 on one specified parameter pID of one specified virtual device vdID. The detected parameter change amount val may be data that indicates a change amount relative to the value of the parameter according to an operation amount of the control or may be data that indicates an absolute parameter value according to an operation position (an absolute position in a operation range of the control) of the control. Alternatively, the detected parameter change amount val may be data that indicates an operation amount of the control or may be data that indicates an operation position of the control.

In step S4, the CPU 10 of the control device changes the current value P'(pID) of the operated and changed parameter pID specified by the vdID set in the dIDx 62 in the virtual current 54 according to the change amount val of the detected parameter value.

In step S5, the CPU 10 updates display of the parameter pID in the parameter adjustment screen 70 being displayed on the display (UI 13) of the control device according to the change result of the parameter value P'(pID) of the virtual current 54 in step S4. Thus, for example, when the value of the parameter is displayed as the knob image 74, as shown in the frame 72a, the rotation position (the angle of the knob) of the knob image 74 is changed with the current operation state of the control or the like. Further, when the value of the parameter is displayed as the button image 75, as in the frame 72b, the lighting state or the non-lighting state of the button is changed with the current operation state of the control or the like. Since the display of the value of the parameter in the control device is promptly updated in response to the operation of changing the value of the parameter on the side of the control device, the display update well responds to the changing operation.

In step S6, the CPU 10 determines whether the virtual device to be controlled is in the online state based on the online flag 55 (OF (dIDx)) of the virtual device to be controlled. When the virtual device is in the online state (YES at step S6), the CPU 10 generates a change command SET in response to the operation of changing the value of the parameter at the current time and transmits the generated change command SET to the controlled device (real device) corresponding to the virtual device to be controlled via the network 9 in step S7. That is, the configuration in which steps S4 to S7 are performed in response to the operation of changing the value of the parameter on the parameter adjustment screen 70 functions as a parameter value changing operation receiving unit.

The change command SET is data that includes the pID for specifying the parameter, the change amount val, and the rcID (denoted by reference numeral 61 in FIG. 6) for specifying the control device as the transmission source of the change command SET. The IP address 53 included in the virtual device data 50 of the virtual device to be controlled is designated as the destination of the change command SET. Accordingly, the change command SET is transmitted only to one controlled device corresponding to the virtual device to be controlled among the plurality of controlled devices 4 to 8 on the network 9.

The change amount val included in the change command SET may be data that indicates a relative change amount of the control in the control device, may be data that indicates the operation position of the control, may be the parameter value P'(pID) of the virtual current 54 changed in response to the operation, or may be the change amount of the parameter value P'(pID) of the virtual current 54 in response to the operation.

Conversely, when the virtual device to be controlled is in the offline (NO in step S6), it is not necessary to transmit the change command for the controlled device, and thus the CPU 10 directly ends the process. Accordingly, during the offline state, the operation of changing the value of the parameter in the control device is reflected only on the virtual current 54 of the control device and is not reflected on the real current 44 of the controlled device.

Figure 10:
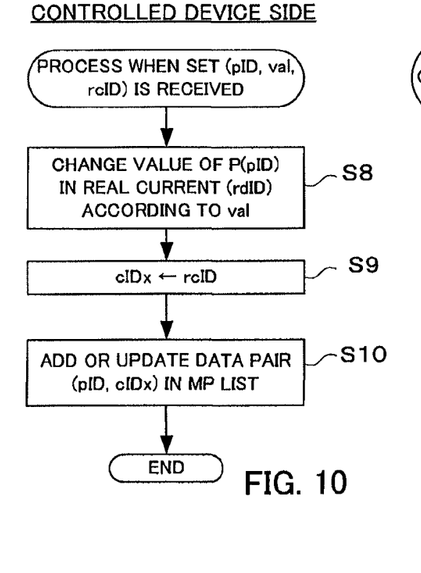
FIG. 10 is a flowchart illustrating a process performed by the controlled device, when the controlled device receives a change command.

The controlled device (real device) corresponding to the IP address 53 designated as the destination of the change command SET receives, via the network 9, the change command SET transmitted from the control device in step S6. FIG. 10 is a flowchart illustrating a process performed by the CPUs (denoted by reference numerals 20 and 30 in FIGS. 3 and 4) of the controlled devices 4 to 8, when the controlled device receives the change command SET transmitted in step S6. The CPU of a given control device starts the process of FIG. 10, when the controlled device receives the change command SET.

In step S8, the CPU of the controlled device specifies one parameter of the real current 44 of the controlled device using the pID included in the received change command SET and changes the value P(pID) of the specified parameter pID according to the change amount val included in the change command SET. Thus, the parameter value P(pID) of the real current 44 becomes the same as the parameter value P'(ID) in the corresponding virtual current 54 in the control device as the transmission source of the change command SET.

In step S9, the CPU of the controlled device sets the reID included in the received change command SET in the cIDx 45 in the memory of the controlled device itself. In step S10, the CPU of the controlled device generates a data pair of the pID of the parameter changed in step S8 and the cIDx 45 in which the rcID is set in step S9, adds, or overwrites and updates the generated data pair to or on the MP list 46 in the memory of the controlled device itself, and then ends the process. That is, when the data pair including the pID is not present in the MP list 46, the generated data pair is newly added to the MP list 46. Conversely, when the data pair including the pID is present in the MP list 46, the data pair including the previous pID is overwritten by the currently generated data pair. That is, the value of the cIDx included in the previous data pair is updated to the rcID (the rcID included in the change command SET received at this time) set in the cIDx 45 in step S9. Accordingly, the MP list 46 does not doubly store the data pair regarding one pID. When the plurality of different control devices transmit the change commands SET to change the value of the parameter of a given pID of a given controlled device during a given notification period to be described below, the controlled device changes the value of the parameter of the pID using the change amount val included in the change command SET in response to the change command SET received from the different control devices, and overwrites and updates the data pair of the pID of the MP list 46 using the rcID included in the change command SET. During the last of the notification period, the rcID described in the finally received change command SET is stored finally in the data pair of the pID of the MP list 46. That is, the data pair of each pID of the MP list 46 maintains the rcID of the control device that finally performs the remote control on the value of the parameter of the pID during the notification period.

Figure 11:
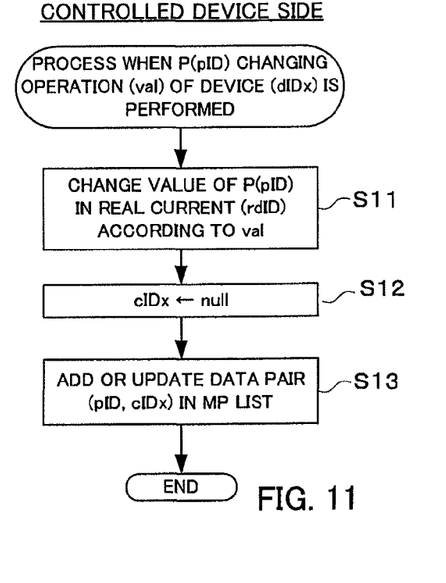
FIG. 11 is a flowchart illustrating a parameter value changing process performed by the controlled device in response to a user's operation.

The operation of changing the values of the parameters in the real currents 44 of the controlled devices 4 to 8 is performed in local control in which the user interfaces (denoted by reference numerals 23 to 25 and 33 in FIGS. 3 and 4) included in the controlled devices themselves are used. FIG. 11 is a flowchart illustrating a process performed by the CPUs (denoted by reference numerals 20 and 30 in FIGS. 3 and 4) of the controlled devices in response to an operation of changing the value of a local parameter, when the local control (the operation of changing the value of the local parameter) is performed on the value of the parameter by a given controlled device. The CPU of the given controlled device (rdID) detects the parameter change amount val in response to a user's operation of changing the value of the local parameter, specifies the pID of the operated and changed parameter, and activates the process of FIG. 11 on one specified parameter pID.

In step S11, the CPU of the controlled device changes the value P(pID) of the parameter pID in the real current 44 of the controlled device itself according to the detected change amount val.

In step S12, the CPU of the controlled device sets "null" indicating no control device in the variable cIDx in the memory of the controlled device itself. In step S13, the CPU of the controlled device adds, or overwrites and updates a data pair of the pID of the parameter changed in step S11 and the cIDx in which the rcID is set in step S12 to or on the MP list 46 of the memory of the controlled device itself, and then ends the process. In this case, the data pair in which "null" is set as the value of the cIDx is added to or overwritten and updated in the MP list 46.

The CPUs (denoted by reference numerals 20 and 30 in FIGS. 3 and 4) of the controlled devices 4 to 8 perform a known processing routine (not illustrated) and reflect the change result of the parameter value in step S8 or step S11 to the operation of the controlled device. That is, the CPUs 20 and 30 of the controlled devices 4 to 8 perform the known processing routine (not illustrated) and control an operation (generally, signal processing performed by the DSPs (denoted by reference numerals 27 and 36 in FIGS. 3 and 4)) of the controlled device serving as an audio device based on the real current 44 of the controlled device. For example, when a level parameter of a given audio signal of the real current 44 is changed, a coefficient multiplied to the audio signal in the DSP is changed according to the changed value. When a filter parameter is changed, a coefficient used in the filter processing in the DSP is changed according to the changed value. When an effect type is changed, a micro-program defining an algorithm of a process performed by the DSP is changed according to the changed value. This configuration functions as an operation control unit that controls the operation of the controlled device based on the plurality of parameters stored in the real current 44.

Figure 12:
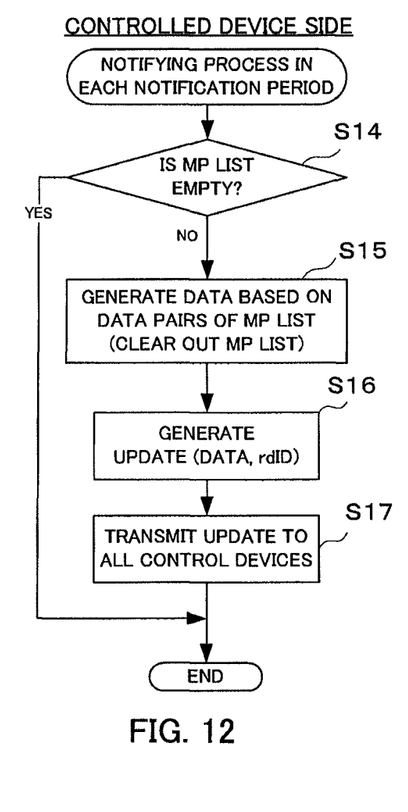
FIG. 12 is a flowchart illustrating a change notifying process performed by the controlled device.

FIG. 12 is a flowchart illustrating a change notifying process of notifying a change result of the value of a parameter of the real current 44 to the control devices 1 to 3, when the CPUs (denoted by reference numerals 20 and 30 in FIGS. 3 and 4) of the controlled devices 4 to 8 perform the change notifying process. The CPU of the controlled device repeatedly performs the process of FIG. 11 in each predetermined change notification period. The change notification period may be set to an appropriate period, such as a period from several milliseconds to tens of milliseconds, corresponding to a display update period of the display of the control devices 1 to 3. Of course, the change notification period may not be a strictly constant period, but may be a period intermittently repeated appropriately at intervals.

In step S14, the CPU of the controlled device inspects whether the data pair is recorded in the MP list 46 in the memory of the controlled device itself. When one or more data pairs are recorded in the MP list 46 (NO at step S14), the CPU of the controlled device generates DATA based on the MP list 46 in step S15. The CPU of the controlled device generates the DATA, and then clears out the recorded content of the MP list 46.

The DATA is formed by one or more data sets corresponding to all of the data pairs in the MP list 46. One data set includes a current parameter value P(pID) of a parameter of which a value is changed within the latest notification period, a pID for specifying the parameter, and a cIDx that indicates the control device having changed lastly the parameter value P(pID) in correspondence with one data pair. The CPU of the controlled device can acquire the parameter value P(pID) in the real current 44 specified by the pID of the data pair for each data pair of the MP list 46 and generates one data set by configuring the acquired parameter value P(pID), the pID specifying the parameter, and the cIDx of the data pair as one set. Accordingly, when a given parameter value P(pID) is changed through the remote control by one of the control devices 1 to 3, the rdID that indicates the control device having transmitted lastly the change command SET within the notification period is set in the cIDx of the data set regarding the parameter value P(pDD). Alternatively, when a given parameter value P(pID) is finally changed through the local control in the controlled device, a value "null" indicating no control device is set in the cIDx of the data set regarding the parameter value P(pID). As described above, when the data pair regarding one pID is not stored doubly in the MP list 46 (the previous data pair is updated) and one parameter value P(pID) is changed a plurality of times within the notification period, the DATA includes one parameter value P(pID) at the time of ending the notification period and the rcID (or null) of the control device associated with the final change of the plurality of changes.

In step S16, the CPU of the controlled device generates a change notification UPDATA (DATA, rdID) that includes the DATA generated in step S15 and the rdID 42 of the controlled device. The change notification UPDATA is data that indicates the change result of the value of the parameter of the real current 44 in the latest notification period. In step S17, the CPU of the controlled device transmits the change notification UPDATA generated in step S15 to all of the control devices 1 to 3 on the network 9. The change notification UPDATA is once transmitted in a broadcast manner by designating a broadcast address as destinations so that the change notification UPDATA is transmitted to all of the control devices 1 to 3 on the network 9, or is transmitted in a multi-cast manner by designating multi-cast addresses of a specific group (all of the control devices 1 to 3) as destinations.

Conversely, when the MP list 46 is empty (YES in step S14), the CPU of the controlled device directly ends the process. Accordingly, when any value among the values of the plurality of parameters of the real current 44 is not changed within the notification period, the change notification UPDATA is not transmitted. That is, the change notification UPDATA is transmitted in step S17, only when at least one parameter value of the real current 44 is changed within the notification period by the change command SET from the control device or the local control (the operation of changing the value of the local parameter) of the value of the parameter in the controlled device. That is, the configuration in which the real current 44 is changed in step S8 by receiving the change command SET for each pID and the change notification UPDATA that includes the cIDx (first data) indicative of the control device having transmitted lastly the change command SET and the parameter value P(pID) (second data) indicative of the change result (a value of a parameter) according to the change command SET is generated and transmitted to the plurality of control devices 1 to 3 in steps S15 to S17 functions as a change command receiving unit. Further, the configuration in which the value of the parameter of the real current 44 is changed through the operation of changing the value of the local parameter in step S11 and the change notification UPDATA that includes the cIDx (first data) indicating no control device and the parameter value P(pID) (second data) indicating the change result according to the change command SET is generated and transmitted to the plurality of control devices 1 to 3 in steps S15 to S17 functions as a local parameter value change operation receiving unit.

Figure 13:
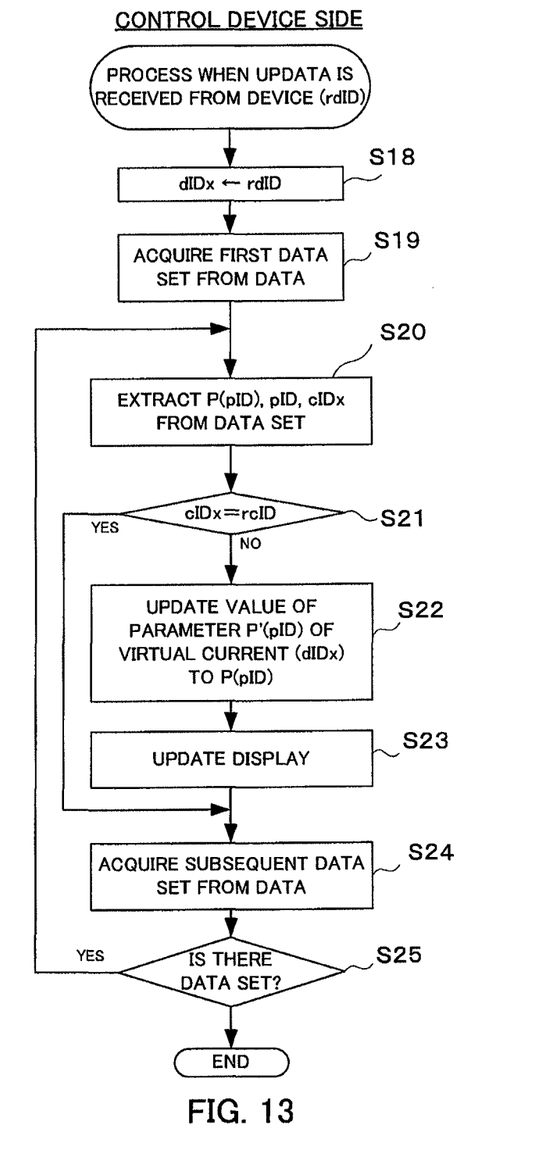
FIG. 13 is a flowchart illustrating a process performed by the control device when the control device receives a change notification.

FIG. 13 is a flowchart illustrating a process performed by the CPU 10 of each of the control devices 1 to 3 in response to reception of the change notification UPDATA transmitted in step S17. The CPU 10 of each of the control devices 1 to 3 starts the process illustrated in FIG. 13, when the CPU 10 receives the change notification UPDATA from one of the controlled devices 4 to 8 via the network 9.

In step S18, the CPU 10 of the control device extracts the rdID from the change notification UPDATA and sets the extracted rdID in the dIDx 62 of the memory 11. The CPU 10 of the control device specifies the virtual device vdID corresponding to the rdID of the controlled device as the transmission source of the change notification UPDATA based on the rdID set in the dIDx 62. When the rdID of the controlled device and the vdID of the virtual device are in the online state, as described above, the vdID has the same value as the rdID. The change notification UPDATA may be configured not to include the rdID. For example, the vdID 52 of the virtual device having the IP address 53 identical with the IP address of the transmission source of the change notification UPDATA may be specified and the vdID 52 may be set in the dIDx 62. In short, the data for specifying the controlled device as the transmission source of the change notification UPDATA can be set in the dIDx 62.

In step S19, the CPU 10 of the control device acquires the first data set from one or more data sets in the DATA included in the received change notification UPDATA. The acquisition order of the data sets can be determined based on, for example, the pID in the data set.

In step S20, the CPU 10 of the control device extracts the parameter value P(pID), the pID for specifying the parameter, and the cIDx from the acquired data set. In step S21, the CPU 10 of the control device inspects whether the value of the extracted cIDx indicates the rcID of the control device based on the rcID 62 stored in the memory 11 of the control device itself. The control device receiving the change notification UPDATA can specify the rcID of the control device performing the operation of changing the parameter value P(pID) included in the data set among the plurality of control devices 1 to 3 by the value of the cIDx included in the data set in the change notification UPDATA.

When the value of the cIDx does not indicate the rcID of the control device, that is, the value of cIDx is the rcID indicating a separate control device or is null (NO in step S21), in step S22, the CPU 10 of the control device specifies the vdID of the virtual device corresponding the rdID set in the dIDx 62 in step S18, specifies the parameter to be changed by the pID extracted from the data set in step S20, and updates the specified parameter value P'(pID) of the virtual current 54 of the specified vdID of the virtual device to the parameter value P(pID) extracted from the data set in step S20. In step S23, the CPU 10 of the control device updates the display of the parameter value P'(pID) according to the change result of the virtual current 54 obtained in step S22. Specifically, the rotation position on the knob image of the parameter adjustment screen 70 is changed or the lighting and non-lighting state of the button image is changed.

Conversely, when the value of the cIDx indicates the rcID of the control device (YES in step S21), the CPU 10 of the control device does not perform the processes of steps S22 and S23, and causes the process to proceed to step S24. That is, when the control device performs the operation of changing the parameter value P(pID), the value of the parameter of the virtual current 54 is not changed according to the change notification UPDATA transmitted from the real device and the display update is not performed. The change result of the virtual current 54 obtained in response to the user's operation in the control device in step S4 and the display update in step S5 are maintained. That is, the processes of steps S21 to S23 function as a change notification receiving unit.

In step S24, the CPU 10 of the control device acquires the subsequent data set from one or more data sets in the DATA included in the received change notification UPDATA and performs the processes of steps S20 to S23 on the acquired data set. Then, the CPU 10 of the control device repeats the steps S20 to S24, until the unprocessed data set is not present in the DATA included in the received change notification UPDATA (YES in step S25). When the unprocessed data set is not present in the DATA included in the received change notification UPDATA (NO in step S25), the process ends.

In the process described above in FIG. 13, for example, even when one given control device on the network 9 transmits the latest change command in response to a user's operation of changing the value of the parameter, and then receives the old change notification UPDATA corresponding to the change command previous to the latest change command from the controlled device due to delay relevant to the remote control, the control device can display the parameter value P'(pID) of the virtual current 54 on the parameter adjustment screen 70 according to the current operation state of controls (24, 25, etc.) without performing the change in the parameter value P'(pID) of the virtual current 54 according to the received change notification UPDATA due to branching at step S21 to YES. There is no delay which is caused due to the fact that the displayed value of the parameter does not directly follow the current operation state because the virtual current 54 is not changed in response to the change notification UPDATA transmitted via the network 9 and is relevant to the remote control. On the other hand, when other control devices, on the network 9, different from the control device in question receive the change notification UPDATA from the controlled device, each process at step S21 of those control devices branches to NO, and, at subsequent steps S22 and S23, the parameter value P'(pID) of the virtual current 54 is changed according to the change notification UPDATA. Therefore, the change result of the real current 44 according to the user's operation of changing the value of the parameter in the one given control device can be remotely monitored on the parameter adjustment screen 70.

According to the above-described embodiment, since each data set of the change notification UPDATA transmitted from the controlled devices 4 to 8 to the control devices 1 to 3 via the network 9 is configured to include the cIDx (first data) indicative of the control device having transmitted the change command SET corresponding to the change notification UPDATA relevant to the data set, the control device (the control device receiving the user's operation of changing the value of the parameter) having transmitted the change command SET does not change the virtual current 54 according to the data set of the change notification UPDATA transmitted via the network 9 and can maintain the value of the parameter of the virtual current 54 in response to the user's operation of changing the value of the parameter. Therefore, when the values of the parameters of the controlled devices 4 to 8 connected via the network 9 are subjected to the remote control and the remote monitoring by the plurality of control devices 1 to 3, it is possible to obtain the excellent advantage of suppressing the influence of delay relevant to the remote control on the value of the parameter stored in the virtual current 54 of the control device receiving the user's operation of changing the value of the parameter.

When the operation of changing the value of the local parameter is performed on the side of the controlled devices 4 to 8, all of the control devices 1 to 3 on the network 9 can change the parameter value P'(pID) of the virtual current 54 according to the change notification UPDATA and monitor the result of the local control on the side of the controlled devices by setting the value "null" indicating no control device as the cIDx (first data) included in the change notification UPDATA (step S12 described above in FIG. 11).

In the embodiment described above, when a plurality of parameters are changed within the notification period, the controlled device includes a plurality of data sets respectively corresponding to the changed parameters in one change notification UPDATA and transmits the one change notification UPDATA. Alternatively, each of a plurality of data sets may be included in one change notification UPDATA', and the plurality of change notification UPDATA may be transmitted. In the alternative embodiment, however, since there are a plurality of packets to transmit, there is a disadvantage that the bandwidth of a network is more consumed.

It should be noted that, whereas in the above-described embodiment, the cIDx is configured to be included in each data set of the change notification UPDATA, another arrangement can be considered such that the change notification UPDATA is transmitted to only all of the control devices (other control devices) other than the control device rcID indicated by the cIDx, when the change notification UPDATA is transmitted in step S17 described above without writing the cIDx (first data) indicating the control device having transmitted the change command SET corresponding to the change notification UPDATA in the data set in the change notification UPDATA. As a manner of transmitting the change notification UPDATA, for example, there may be such a manner that the change notification UPDATA is individually transmitted to each of the IP addresses of all the control devices (other control devices) other than the control device reID indicated by the cIDx indicating each data pair in the MP list 46. Further, there may be such another manner that a multicast group including all of the control devices (other control devices) other than the control device rcID indicated by the cIDx is generated and the change notification UPDATA is transmitted in a multicast manner to the multicast addresses of the multicast group. In this configuration, the same processes as those of steps S21 to S23 described above, that is, the control device having transmitted the change command SET corresponding to the change notification UPDATA can maintain the value of the parameter of the virtual current 54 in response to the user's operation of changing the value of the parameter without changing the virtual current 54 according to the change notification UPDATA, and the control device different from the control device having transmitted the change command SET can change the virtual current 54 according to the change notification UPDATA. However, this configuration is inferior to the configuration in which the change notification UPDATA including the cIDx is transmitted to all of the control devices 1 to 3, because the change notification UPDATA is transmitted individually to the IP address for each data pair of the MP list 46, or the multicast group is generated and the change notification UPDATA is transmitted in a multicast manner to the multicast addresses of the multicast group.

Figure 1:
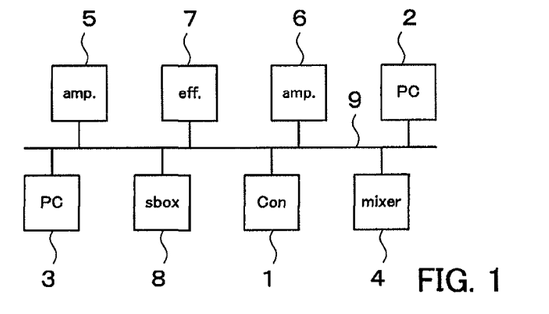
FIG. 1 is a block diagram illustrating an overall configuration of a remote control system according to the present invention.

The configuration of the remote control system to which the invention is applied is not limited to the configuration of the remote control system (including the three control devices 1 to 3 and the five controlled devices (audio devices) 4 to 8) as shown in FIG. 1. A remote control system including a plurality of control devices and at least one controlled device may be configured. Further, the models of the audio devices serving as the controlled devices 4 to 8 are not limited to the mixer 4, the amplifiers 5 and 6, the effector 7, and the stage box 8. Any type of audio device may be used, as long as the audio device is an audio device that performs signal processing on an audio signal and is subjected to the remote control and the remote monitoring by a control device.

The invention claimed is:

1. A system comprising a plurality of control devices and at least one controlled device connected to each other via a communication network, the controlled device comprising a first memory adapted to store a parameter for controlling an operation of the controlled device, the controlled device configured to change a value of the parameter stored in the first memory based on a change command transmitted from any one of the plurality of control devices, each of the plurality of control devices comprising a second memory adapted to store a parameter corresponding to the parameter stored in the first memory of the controlled device, each of the plurality of control devices configured to change a value of the parameter stored in the second memory in response to a user's operation and transmit the change command corresponding to the change in the value of the parameter to the controlled device, wherein the controlled device further comprises a change notification transmitting unit adapted to, in response to reception of the change command from any one of the control devices, transmit a change notification to the plurality of control devices, the change notification including first data indicative of the one of the control devices as a transmission source of the change command and second data indicative of a value of the parameter stored in the first memory which is changed based on the change command, and wherein each of the plurality of control devices further comprises a change notification receiving unit adapted to, in response to reception of the change notification from the controlled device, update the value of the parameter stored in the second memory based on the second data of the received change notification when the first data included in the received change notification does not indicate the control device, whereas the change notification receiving unit does not update the value of the parameter stored in the second memory when the first data indicates the control device.

2. The system according to claim 1, wherein the controlled device further comprises a change operation receiving unit adapted to change the value of the parameter stored in the first memory in response to the user's operation, and wherein the change notification transmitting unit adapted to, in response to the change in the value of the parameter by the change operation receiving unit, generate the change notification including the first data indicative of no control device and the second data indicative of the changed value of the parameter, and transmit the generated change notification to the plurality of control devices via the communication network.

3. The system according to claim 1, wherein the change notification transmitting unit is configured to be repeatedly invoked at time intervals and to transmit the change notification if the value of the parameter in the first memory is changed during a latest time interval among the time intervals.

4. The system according to claim 3, wherein the first data indicates one of the control devices which transmits the change command last in the latest time interval and the second data indicates the value of the parameter at the end of the latest time interval.

5. The system according to claim 1, wherein the first memory is adapted to store a plurality of parameters including the parameter for controlling an operation of the controlled device, and the second memory is adapted to store a plurality of parameters corresponding to the parameters stored in the first memory, and wherein the change command transmitted by each of the control devices indicates the parameter among the parameters in the second memory, and the change notification transmitted by the controlled device includes third data indicative of the parameter among the parameters in the first memory.

* * * * *